(12) United States Patent
Munoz De Juan

(10) Patent No.: US 7,959,429 B2
(45) Date of Patent: Jun. 14, 2011

(54) SYSTEM FOR MANUFACTURING INTEGRATED SOCKETS IN BIAXIALLY ORIENTED PLASTIC PIPES

(75) Inventor: Ignacio Munoz De Juan, Madrid (ES)

(73) Assignee: Molecor Tecnologia, S.L., Madrid (ES)

(*) Notice: Subject to any disclaimer, the term of this patent is extended or adjusted under 35 U.S.C. 154(b) by 182 days.

(21) Appl. No.: 12/446,978

(22) PCT Filed: Jan. 18, 2007

(86) PCT No.: PCT/ES2007/070010
§ 371 (c)(1),
(2), (4) Date: Jul. 30, 2009

(87) PCT Pub. No.: WO2008/087235
PCT Pub. Date: Jul. 24, 2008

(65) Prior Publication Data
US 2010/0028476 A1 Feb. 4, 2010

(51) Int. Cl.
*B29C 57/04* (2006.01)
(52) U.S. Cl. 425/384; 425/393; 425/400; 425/DIG. 218
(58) Field of Classification Search .......... 425/383–384, 425/392–394, 398, 400, DIG. 218
See application file for complete search history.

(56) References Cited

U.S. PATENT DOCUMENTS

| | | | |
|---|---|---|---|
| 3,160,130 A | 12/1964 | Pesak | |
| 3,929,958 A | 12/1975 | Parmann | |
| 3,942,935 A * | 3/1976 | Heisler | 425/393 |
| 4,340,344 A | 7/1982 | Aston et al. | |

FOREIGN PATENT DOCUMENTS

| | | |
|---|---|---|
| EP | 0700771 | 4/1999 |
| EP | 0930148 | 9/2001 |
| ES | 2132365 | 3/1996 |
| WO | WO 90/15949 | 12/1990 |
| WO | WO 98/56567 | 6/1997 |
| WO | WO 02/00926 | 1/2002 |

* cited by examiner

*Primary Examiner* — Richard Crispino
*Assistant Examiner* — Thu Khanh T Nguyen
(74) *Attorney, Agent, or Firm* — K&L Gates LLP

(57) ABSTRACT

An example system is described for the integrated manufacturing of sockets in oriented pipes, with the possibility of regulating and distributing at will the thicknesses of the socket and making it possible to reinforce the traditionally weaker zones, without increasing the manufacturing process time. The system includes a support body, a slide block sliding axially on the inside of the body with a conical inner end, a heater, and a slide rod for pushing the corresponding blank. The slide rod has an axial and central orifice for the introduction of expansion and cooling fluid, whilst the slide block has orifices for the intake of a lubricating fluid.

7 Claims, 1 Drawing Sheet

SYSTEM FOR MANUFACTURING INTEGRATED SOCKETS IN BIAXIALLY ORIENTED PLASTIC PIPES

BACKGROUND

The present description relates to a system for manufacturing of integrated sockets in oriented plastic pipes. The described system is included within the field of manufacturing processes of molecularly oriented profiles, in particular within discontinuous systems.

Molecular orientation is a process wherein, by applying a mechanical deformation to a previously extruded pipe or blank, under suitable conditions of temperature, pressure, deformation speed and deformation radius a substantial modification of its mechanical properties is produced, principally the sigma of the material, impact resistance, creep improvement, resistance to crack propagation, Young's module, etc.

In such molecular orientation processes, an pipe highly resistant to bending or deformation is produced, with less raw material and with identical or superior features, thanks to the better resistance to bending or deformation of the material.

There are various methods or systems for the manufacturing of tubular profiles, which can be grouped in two categories: Continuous or line systems and discontinuous systems.

Generally, discontinuous systems are based on producing the molecular orientation "element by element", which is achieved by an expansion of a blank within a mould which provides the definitive shape of the tubular profile.

Line processes are different and the orientation occurs continuously and simultaneously at the actual extrusion, there being no interruption in the process, nor intermediate stock, or the like.

Oriented pipes can be joined together to form a fluid conduction line with at least two different manners. One approach is by sleeves, which are independent interconnection parts that can be assembled on tubes with a constant, circular section. Another approach is by the formation of a socket in each pipe; the socket makes it possible to insert the end of one pipe into the socket of another pipe. Each pipe has two different ends, one plain and another formed with a socket, which can be assembled into a line, and the socket can have sufficient space to house a gasket seal of flexible material, which ensures hermetic closure of the pipe network.

The continuous or line production processes, due to their nature, may require that the socket-forming process is a process separate from that of the molecular orientation. For this purpose special machines are usually required which make the socket in a later stage performed after the orientation.

EP0700771, U.S. Pat. No. 3,929,958 and U.S. Pat. No. 3,160,130 describe examples of processes which use auxiliary machinery or tools in order to produce sockets in pipes after the orientation phase.

In EP 0700771, a pressurized-fluid workhead is used for permanently bell-forming end portions of plastic pipes. This document describes how the pipes can be associated with special workheads which combine shaped buffers with forming chambers to heat-form the pipe, cooling it inside the workhead in order to render the belling permanent.

U.S. Pat. No. 3,929,958 describes a process for producing radially-expanded socket ends on thermoplastic pipe lengths wherein the heated end of a pipe is conformed with a mould to produce an internal radially expanded peripheral groove.

U.S. Pat. No. 3,160,130 discloses a method and apparatus for manufacturing hollow articles by expansion of elongate hollow rigid blanks, the method comprising deforming the blank starting at one end, or at an area close to one end, and proceeding along its length. The deformation is achieved by the use of forces, attention being paid during the process to the amount, rate and location of the deformation caused by those forces. This document also describes the control of those deformations during the process.

Discontinuous processes permit the socket to be formed integrally, i.e. the socket can be formed at the same time as the pipe is formed, or made similarly to the aforementioned, as a process external to that of pipe orientation.

Various patent documents can be cited for the production of non-integral sockets, as an extra process, the following being representative:

WO 2002/00926 describes a system for heating the oriented pipe with water, wherein the heating zone is limited by two caps so that once heated and under pressure the pipe is formed against a stamp which provides the shape. Subsequently, the blank is cooled and the water is extracted.

EP 0930148 describes a heating machine which heats the zone to form the pipe at a temperature similar to that used for orientation. Subsequently, a sharp expansion element is inserted, which causes the heated material in plastic state to take the form of the profile of the expansion element, and the materials is then cooled below the temperature of the plastic-solid transition. Once cooled, the parts forming the rubber seal are retracted, until the expansion element has a constant sector, and this element exits the interior of the already formed pipe.

Systems for making integrated seals include U.S. Pat. No. 4,340,344, WO 98/56567 and WO 90/15949 (PCT/AU90/00265). In these cases, the described systems comprise, at one end of the mould, a cavity where on expanding the pipe, a part of the pipe expands into this section, giving rise to the socket, and is subsequently cooled by contact of the pipe metal with the mould.

SUMMARY

The present description generally relates to a system for the integral manufacturing of sockets in oriented pipes, with the possibility of regulating and distributing the thicknesses of the socket at will. The system makes it possible to reinforce traditionally weak areas, without increasing the times of the manufacturing process and with good energy efficiency.

One example embodiment of the described systems forms the sockets with a housing for gasket seals in a pipe of molecularly oriented plastic material integrated within the production of discontinuous systems.

The present description includes a simple example system which addresses the aforementioned problem, and employs a support body coupled to one of the closures of the mould or head to permit the integral production of the socket. A useful benefit of a described example embodiment includes an ability to distribute thicknesses at will within the socket profile, and also enabling the traditionally thinnest part of the socket profile, due to the nature of the process, to be thickened and reinforced, if desired.

In accordance with one described example system, thickness regulation can be achieved within the integral socket process, by employing the following:

a central support body, which is provided to join to the body of the pipe orientation mould;

a coaxial sliding part or slide block with conical form, which slides axially, being primarily advanced when forming the socket to progressively remove backwards;

a heater incorporated in the sliding part or slide block, for heating the slide block, which heater can be electric, or can employ the circulation of a hot fluid or can be another appropriate system which will maintain the slide block at the orientation temperature;

small orifices in said slide block or sliding part to permit the intake of lubricant and facilitate the sliding of the plastic on the slide block, so that the heater and the orifices provide an auxiliary system permitting the conditioning of the parts of the system unit for optimum behaviour;

mechanical grippers to fix the plastic pipe so that it does not move during the orientation or expansion;

a slide rod which pushes the blank forward, which rod is initially retracted and when the orientation process starts, the slide rod can move axially in the opposite direction to direction of movement of the slide block. The rod is equipped with an axial and central orifice which permits the passage, via intake or outlet, of fluids both for the expansion process and for the cooling process, enabling cooling fluid to be projected through the orifice of the rod, even with interior pressure.

Said moving elements, both rod and slide block, as well as grips, are moved by actuators of any type of axial shape, for example cylinders, threaded systems, or the like.

BRIEF DESCRIPTION OF THE DRAWING

To facilitate a better understanding of the description, and to illustrate in a non-limiting manner an example of a practical embodiment thereof, reference is made to the single FIGURE of the accompanying drawings which is a longitudinal sectional view of the elements and parts comprising an integrated socket manufacturing system according to this description.

DETAILED DESCRIPTION

Figure 1:
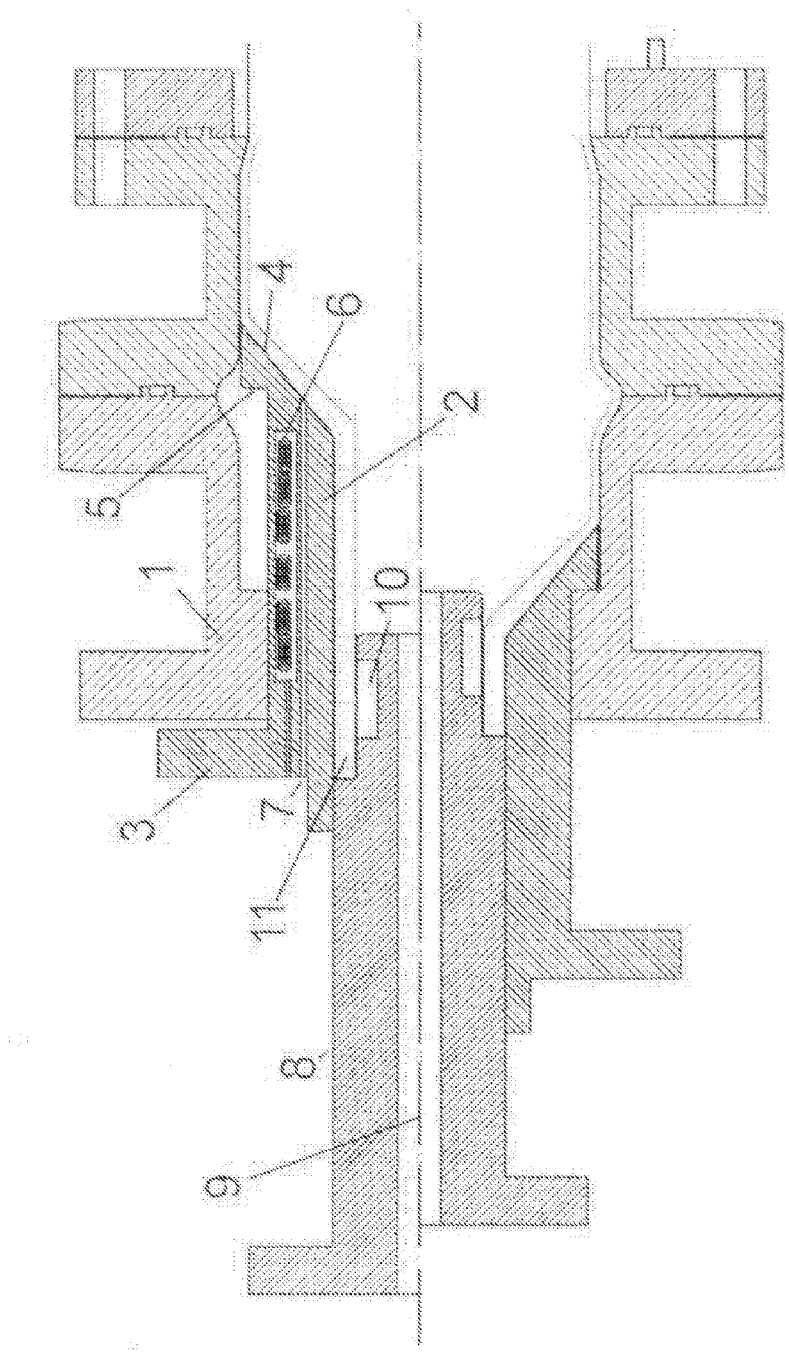

The system described in WO 2002/00926 may permit temperature regulation, but can be slow and lacks a thickness control.

In systems for making integrated seals such as are described in U.S. Pat. No. 4,340,344, WO 98/56567 and WO 90/15949 (PCT/AU90/00265) the process starts from a blank of constant section, and when the socket is formed, in the zones where the expansion is greater, a thinning of the pipe wall may occur, since the final diameter attained is greater and since the same quantity of material has to be distributed over a greater surface. This part of the pipe comprises the upper part of the housing of the seal, which is a part that should bear more axial loads, and may be more sensitive to on-site impacts or accidents. Thus, the part which should be strong, owing to the nature of the process is, in terms of thickness, weak. In other words, the upper part of the blank, at its upper diameter, is thinned after the production of the socket, in accordance with the profile, owing to the greater diameter of the upper part of the blank with respect to the constant section of the pipe.

This thinning phenomenon, is problematic, not only because of the weak point of the pipe, but also because regulations may require minimum thicknesses at any point of the pipe. The described thinning phenomenon makes it sometimes necessary to thicken the whole pipe, with the use of extra, unproductive raw material, in order that the thin point of the socket may comply with regulations.

Machines that form the socket independently attempt to smooth this effect as far as possible, but do not appear to overcome the problem.

Furthermore, such machines are expensive and costly to operate, possibly requiring substantial investment, yielding slow processing times and introducing a bottleneck into the operations.

Referring to the drawing, the example system shown comprises a support body (1) designed to be coupled to the head of a corresponding mould of pipe molecular orientation, on which will be performed the formation of the socket of the plastic pipe which is introduced into the mould. Through the inside of the support body (1) is mounted, with ease of axial displacement, a coaxial and sliding slide block (2) with a rear flange (3) serving to limit sliding towards the inside of the slide block (2) on the body (1), a slide block (2) which has its inner end of conical shape (4) in accordance with the inner surface, whilst on the outer surface it has a step (5) as limit of maximum displacement towards the exterior of the support body (1).

The slide block (2) incorporates heating elements (6), for example electrical resistances, devices for circulation of hot fluid or any other suitable heating devices, effective to heat the slide block (2) and keep it at the temperature of orientation and formation of the socket.

Likewise, on the slide block (2) small orifices (7) have been provided to permit the intake of a lubricating fluid which will facilitate the sliding of the slide block, all of this so that the heating elements (6) and orifices (7) constitute means of conditioning of the other system components, for their optimum behaviour, i.e. a homogeneous distribution, reduction in forces, avoiding creases or scratches in the plastic and facilitating sliding.

On the other hand, the system also comprises a slide rod (8) designed to push the blank (11) or plastic pipe forward, inside the mould, the rod (8) being affected by an axial and central orifice (9) for the passage, intake or outlet, of the flows provided for the expansion of the blank (11) and for its cooling.

The rod (8) incorporates at its inner end, means (10) of fastening of the blank or plastic pipe (11) preferably constituted by mechanical grips whose function is to prevent the plastic pipe (11) from moving during the orientation or expansion process.

In accordance with the aforementioned, the operation according to the system of the description is as follows:

Initially, the system is as appears in the figure, which shows the upper part of the shaft, with the slide block (2) forward and the rod (8) backward, the grips (10) holding the blank or plastic pipe (11) which has expanded and oriented in its mould, so that the plastic adapts to the resulting cavity, as illustrated in the figure, owing to the pressure inside the mould.

When the socket is to be made, the slide block (2) moves backward slowly, allowing the plastic or blank (11) to adapt to the resulting cavity, which proceeds regularly and smoothly, since the slide block (2) is heated to a temperature similar to that of the blank (11). The sliding surfaces may be lubricated by lubrication fluid introduced via the orifices (7) in the slide block (2).

Creases may be avoided by keeping the inner pressure constant, pushing the plastic against the mould walls.

Simultaneously, the rod (8) starts advancing in the forward direction, opposite to that of displacement of the slide block (2), pushing the blank (11) forward and providing material from the blank to the overall expansion. Using an appropriate ratio of speeds between the rod (8) and slide block (2), the position where that material is contributed may be regulated, preferably this may be in the area of maximum diameter. The position where material is contributed can be regulated at will with a due ratio of speeds and displacements. Generally, to achieve thickening, the speed of the rod (8) may be increased, reducing that of the slide block (2), or both. The opposite may be done to achieve thinning.

Once the process has concluded, the blank (11) is cooled with a cooling fluid introduced through the orifices (9) of the rod (8), whilst maintaining the interior pressure.

Once the blank (11) is cooled, the central orifice (9) of the rod (8) is connected to the atmosphere so that a depressurization occurs, and then the pipe is extracted with its formed socket. All that remains is to finish the socket by cutting off excess material, cleaning, placement of the gasket seal and packaging.

The invention claimed is:

1. A system for manufacturing integrated sockets in biaxially oriented plastic pipes, the system comprising:
    a support body configured to couple the pipe to a mould,
    a slide block coaxial with and axially slidable in said support body,
    a slide rod configured to push against the direction of extrusion of a blank or the plastic pipe and further configured to slide axially within the slide block,
    wherein said slide rod includes an axial central orifice configured to permit the intake and outlet of fluids and also includes a fastener configured to immobile the blank or the plastic pipe during an orientation or expansion process of the blank or the plastic pipe,
    wherein said slide block includes an inner end with an outer conical configuration, a heater configured to heat the slide block, and small orifices extending axially in the slide block for a lubricating fluid; and
    actuators configured to axially displace the slide block and slide rod, and to control relative speed between the slide block and the slide rod to obtain desired thicknesses of the socket formed during the expansion and distribution of the material of the blank or the plastic pipe.

2. A system for the manufacturing of integrated sockets in biaxially oriented plastic pipes, according to claim 1, wherein the heater is electrical or employs circulation of a hot fluid.

3. A system for manufacturing integrated sockets in biaxially oriented plastic pipes, according to claim 1, wherein the slide block comprises stops limiting forward and backward displacement of the slide block inside the support body.

4. A system for manufacturing integrated sockets in biaxially oriented plastic pipes, according to claim 1, wherein the fastener comprises mechanical grips.

5. A system for manufacturing integrated sockets in biaxially oriented plastic pipes, according to claim 2 wherein the slide block further comprises stops limiting forward and backward displacement of the slide block inside the support body.

6. A system for manufacturing integrated sockets in biaxially oriented plastic pipes, according to claim 2 wherein the fastener further comprises mechanical grips.

7. A system for manufacturing integrated sockets in biaxially oriented plastic pipes, according to claim 3 wherein the fastener further comprises mechanical grips.

* * * * *